June 5, 1956 M. L. COHN 2,749,430
ILLUMINATED AUTOMOBILE SECRETARY
Filed June 23, 1952 2 Sheets-Sheet 1
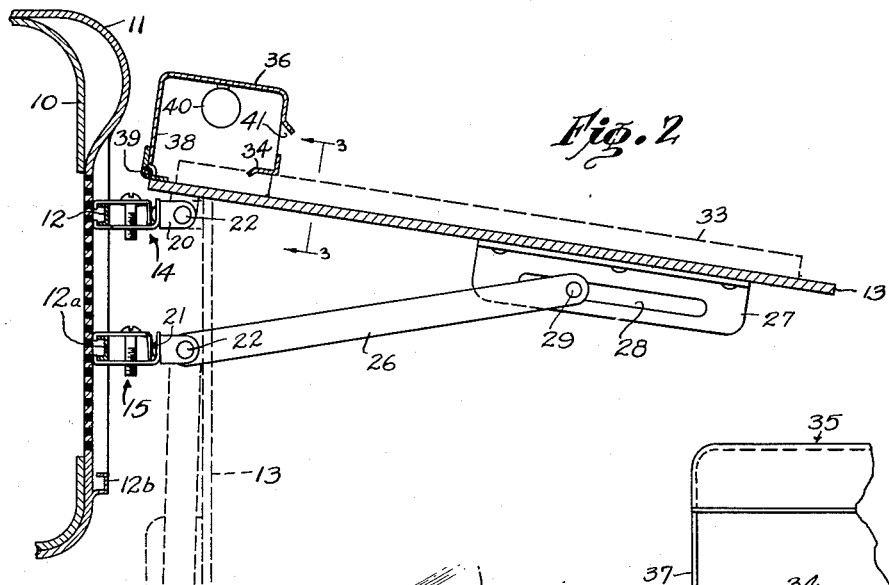
INVENTOR.
Mayer L. Cohn
BY
Lynn H. Latta
ATTORNEY

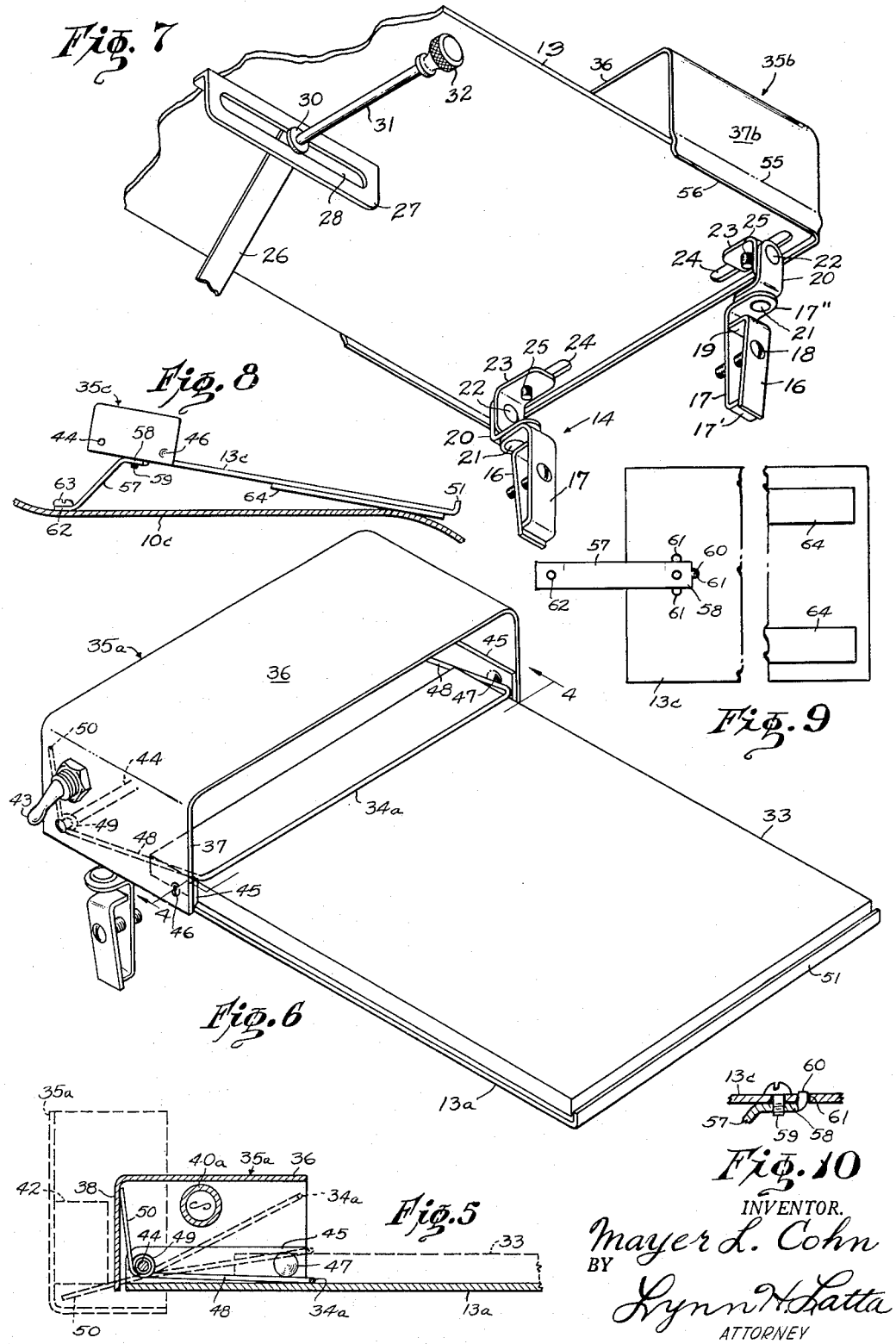

United States Patent Office 2,749,430
Patented June 5, 1956

2,749,430

ILLUMINATED AUTOMOBILE SECRETARY

Mayer L. Cohn, Los Angeles, Calif., assignor to Joseph Marco, Los Angeles, Calif.

Application June 23, 1952, Serial No. 295,039

4 Claims. (Cl. 240—2)

This invention relates to a secretary, or holder for memorandum pads, maps, etc., in automotive vehicles, the general object of the invention being to provide such a device in the form of an accessory which may be readily attached to a portion of an automobile in a position convenient to the writing hand of an automobile driver while sitting behind the wheel.

A further object is to provide an auto secretary having, in combination, means for supporting a memo pad, map or the like, together with means for illuminating the same when lighting conditions require it.

Another object is to provide a secretary having a supporting panel and a light reflector hood which receives the rear end of a memo pad or the like when supported on the panel.

A further object is to provide a secretary having a light reflector hood which is hinged to the panel so that it may be raised for changing light bulbs.

A further object is to provide relatively simple yet effective means to hold a memo pad or the like upon the supporting panel. More specifically, the invention contemplates a hold-down device operatively associated with a hinged reflector hood so as to be spring-loaded against the panel or a pad supported thereon, when the hood is lowered, and so as to be unloaded when the hood is raised.

A further object is to provide such a secretary, having means for supporting the same either in a position of use (extending generally in a horizontal plane) or an inoperative position in which it does not substantially obstruct the space rearwardly of the dash board of the automobile.

A further object is to provide such a secretary, having relatively simple means for clamping a memorandum pad or the like upon the supporting panel of the secretary.

A further object is to provide such a secretary, of relatively simple, inexpensive and yet durable construction.

I am aware that previous proposals for map holders, etc., for attachment to automobiles, have contemplated the attachment of map holders, etc., to various parts of a vehicle. One of the particular objects of the present invention is to provide a pad holder which may be attached to the vehicle in a position of maximum convenience to the writing hand of the operator in the large majority of cases where the right hand is used for writing. It is quite common in passenger vehicles to embody an automobile radio having a frame, covered by an ornamental grille, mounted in the dash or instrument panel of the vehicle. The ornamental grille usually embodies spaced parallel bars which in some cases extend vertically and in others, horizontally. One of the specific objects of the present invention is to provide means for clamping upon these grille members irrespective of whether they extend horizontally or vertically.

Other objects will become apparent in the ensuing specifications and appended drawings in which:

Fig. 1 is a perspective view of a portion of an automobile dash with a memorandum holder embodying my invention, attached thereto;

Fig. 2 is a vertical longitudinal sectional view thereof;

Fig. 3 is a detail sectional view taken on the line 3—3 of Fig. 2;

Fig. 4 is a detail sectional view of a modified form, taken on line 4—4 of Fig. 6;

Fig. 5 is a detail longitudinal sectional view thereof;

Fig. 6 is a perspective view of said modified form;

Fig. 7 is an inverted perspective view of another modified form of the invention;

Fig. 8 is a side view of another modification;

Fig. 9 is a fragmentary inverted plan view thereof; and

Fig. 10 is a sectional detail thereof.

Referring now to the drawings in detail, I have shown in Figs. 1 and 2 how my improved auto secretary may be readily attached to the grille of an automobile radio, so as to locate the secretary in the most convenient position for use by the vehicle driver, namely, just rearwardly of the dash, to the right of the steering wheel, approximately midway between the sides of the vehicle. In this respect, the invention takes advantage of the conventional location of an automobile radio with the grille thereof mounted in the dash or instrument panel of the automobile midway between the sides thereof, and provides for clamping the attachment to the grille or frame of the radio, as a means of connecting the pad holder to the vehicle, in this preferred position.

The dash of the vehicle is indicated at 10. The conventional frame of an automobile radio is shown at 11, such frame including a grille having a series of horizontally extending bars 12, 12a, 12b disposed in vertically spaced relation.

My improved auto secretary embodies a pad supporting panel 13 having a pair of clamps 14 and a third clamp 15 adapted for attachment to such bars as the bars 12, 12a etc. For example, in the particular mounting arrangement shown, the clamps 14 are clamped upon an upper bar 12 and the clamp 15 is clamped upon one of the lower bars (e. g. the bar 12a).

The clamps 14, 15 are as shown in Fig. 5, and are all of identical construction, to reduce the cost of manufacture. Accordingly, each of these clamps include jaws 16 and 17, (Fig. 7) of formed ribbon metal, joined by a clamp screw 18. Screw 18 is loosely extended through an opening in one of the jaws, with adequate clearance for rotation therein, and engaged in a threaded opening in the other jaw. Jaw 17 has at one end an ear 17" bent at right angles thereto, and at its other end a hook 17', also bent at right angles, toward the jaw 16 for cooperation therewith in grasping a member such as the bar 12 of the radio grille. Jaw 16 has a fulcrum finger 19 bent at right angles from one end thereof, to bear against jaw 17. When the clamping devices 14, 15 are attached to horizontal bars such as the bars 12, 12a, the jaw 17 may be arranged in an uppermost position, so as to rest on the upper side of a bar 12 or 12a, and the hook 17' extended downwardly behind the bar 12 or 12a to secure the respective clamping unit against any possibility of being vibrated loose from the member to which it is attached. In such a case, the jaw 16 becomes the lower jaw, engaging the under side of the bar 12 or 12a to draw the upper jaw 17 tightly down against the bar 12.

In other cases, it may be more satisfactory to attach the clamping devices 14, 15 to vertical bars of a radiator grille or other vertical members on a vehicle dash. In such a case, it becomes necessary to adjust the clamping device 14 or 15 about its longitudinal axis. This is provided for by a pivotal connection between mounting ear 17" and a connecting member 20 which is in the form of a small angle bracket of stamped ribbon metal. The pivotal connection is provided by a bolt or rivet 21 extended through registering openings in ear 17" and an adjacent arm of connector 20, in frictional engagement with ear 17″ such as to tend to retain the clamping unit 14 or 15 in any position to which it has been adjusted.

With reference to Fig. 2 it will be noted that, with panel 13 in a substantially horizontal use position, clamping members 14, in order to assume the horizontal positions required for clamping upon the bars 12 as above described, must be disposed substantially parallel to the panel 13. However, when the secretary is not in use, it become desirable to move it closer to the dash in order to minimize interference with the free movements of the occupants of the front seat of the vehicle. To this end, the invention contemplates swinging the panel 13 downwardly to a depending, substantially vertical position indicated in dotted lines in Fig. 2. In order that this may be accomplished, the invention provides a pivotal connection between the connector 20 of each clamp unit 14 and the under side of panel 13, such connection comprising a bolt or rivet 22 extended through the other arm of a respective connector 20 and through the depending arm of an angle bracket 23 which is secured to the under side of panel 13 at a respective forward corner thereof.

To provide for a maximum adjustability of the clamping devices to the conveniently located parts of a particular vehicle, and particularly where the devices 14 are clamped onto vertical members the horizontal spacing of which may vary with different vehicles, I provide for lateral adjustment of brackets 23 toward and from each other. Accordingly, the panel 13 has, in its two forward corners, a pair of slots 24 extending parallel to the forward edge of the panel, and a clamp screw 25 is extended through each slot 24 from above and threaded through the horizontal ear of a respective bracket 23. The head of screw 25 engages the upper face of panel 13, whereby the panel may be clamped between the head and the horizontal ear of bracket 23 when the screw is tightened. Also, the screw 25 provides for bodily pivotal movement of bracket 23 about the axis of the screw, at right angles to the plane of panel 13, where it may be desirable in order to properly adjust the clamping units 14 to the supporting part or parts of the vehicle.

Clamping unit 15 has the same angle connector 20 connecting it, for universal adjusting movement, to one end of a brace rod 26. The other end of brace rod 26 is attached to an elongated bracket 27, disposed in the median longitudinal plane normal to the plane of panel 13. Bracket 27 may be of angle form, with a horizontal arm which is attached to the under side of panel 13 as indicated. It has a longitudinal slot 28 through which is extended the threaded end portion of a clamp screw 29, said end portion being extended through slot 28 and threaded into brace 26. Screw 29 has a shoulder 30, at the base of the threaded end portion of screw 28, for clamping engagement against bracket 27, whereby bracket 27 is clamped between shoulder 30 and the end of brace 26 when the screw 29 is tightened. Screw 29 has an elongteed shaft portion 31 terminating in a narrow head 32 which is preferably disposed slightly beyond the edge of panel 13 where it may be conveniently manipulated by the operator.

By reference to Fig. 2 it may be noted that by loosening screw 29, panel 13 may be lifted to a substantially horizontal position as shown in that figure, screw 29 traveling to a point adjacent the forward end of slot 28. Upon tightening the screw 29, panel 13 will be supported in the raised position. From this position, screw 29 may, when again loosened, travel to the forward end of slot 28, allowing panel 13 to swing downwardly to the dependent position shown in dotted lines of Fig. 2.

A pad of memorandum paper, supported upon panel 13, is indicated in broken lines at 33 in Fig. 2. The rear, or head end of the pad is clamped down upon panel 13 by means of a hold-down bar 34 forming part of a light reflector hood 35. Hood 35 includes a top wall 36, lateral walls 37 projecting downwardly therefrom, and a rear wall 38 (Fig. 2) the lower edge of which is connected to the rear edge of panel 13 by suitable hinge means 39. Mounted within hood 35 is a light bulb 40, adapted to shine through a front opening 41 in hood 35, onto memo pad 33 or other work sheet mounted on panel 13.

Hood 35 is provided with some suitable means for latching the same to panel 13 in its lowered position in which hold-down bar 34 engages pad 33. This may for example, constitute a frictional engagement between flanges 42 forming the lower portions of lateral walls 37, and the side margins of panel 13. To determine the limits of downward movement of hood 35, flanges 42 may be joined to walls 37 by shoulders 43 engageable with the upper face of panel 13 (Fig. 3).

*Preferred form—Figs. 4–6*

In the preferred form of the invention shown in Figs. 4, 5 and 6, lateral walls 37 of hood 35a are hinged to panel 13a by means of a pivot pin 44 the ends of which extend through registering openings in lateral walls 37 and in flanges 45 which are integral with panel 13a, being bent upwardly from the lateral margins thereof at the rear end of the panel. The ends of pin 44 are riveted to retain the pin in position. Latching of the hood 35a in its lowered position is provided for by a pair of coacting dimples 46 and 47 (Fig. 4) in the lateral walls 37 and flange 45 respectively, adjacent the forward extremities thereof.

An improved hold-down yoke, adapted to establish yielding pressure against pad or other work sheet 33, is formed from a single length of spring wire and comprises a hold-down bar 34a, a pair of side arms 48, a pair of loops 49 at the rear ends of arms 48, and extensions 50 projecting upwardly from respective loops 49 and engageable against rear wall 38 of hood 35a. When the hood 35 is in its normal, lowered position shown in full lines in Fig. 5, the hold-down yoke is spring loaded by the forward pressure of wall 38 against extensions 50, so that bar 34a will be yieldingly pressed downwardly against panel 13, or work sheet 33 supported thereon, as the case may be. Loops 49 are coiled around pivot pin 44 to provide pivotal connections between side arms 48 and the panel 13a.

A light bulb 40a, preferably of a narrow, elongated type, is mounted in a socket 41 which in turn is mounted upon the inner side of the casing of a switch unit 42, the latter being mounted against one of the lateral walls 37 of the hood 35. A switch operator lever 43 projects through this lateral wall so as to be externally accessible for actuation by an operator. Switch 42, socket 41 and bulb 40a being arranged in series on an axis extending transversely in hood 35a, light bulb 40a will be located substantially midway between the lateral walls 37. It may now be noted that one of the extensions 50 of the hold-down yoke is confined between switch 42 and rear wall 38, whereby, as the hood is lifted to the raised position shown in dotted lines of Fig. 5, this extension will be engaged so as to lift the hold-down bracket to the raised position shown in dotted lines in Fig. 5.

Along the forward end of panel 13a is an upwardly extending flange 51, to position the forward end of pad 33.

*Modified form—Fig. 7*

Fig. 7, in addition to illustrating the details of construction of the clamp unit 14, shows a modified arrangement for attaching hood 35b to panel 13. In this case, lateral walls 37b of hood 35b have, at their lower margins, channels 55 for receiving the lateral margins of panel 13, and the hood may slide onto the panel, or it may snap on, the channels 55 terminating in outwardly flared lips 56 to provide the snap-on function.

*Modification—Figs. 8–10*

Figs. 8–10 illustrate an alternative means for attaching the secretary to the dash of an automobile. In Fig. 8, the conventional shelf member which projects forwardly from the dash in many automobiles, is indicated at 10c. Instead of the clamp previously described, the panel 13c in this form of the invention is provided with a single bracket leg 57 having at one end an ear 58 into which is threaded a clamp screw 59 (the screw being extended through an opening in panel 13c as indicated in Fig. 10). Formed on the end of ear 58, and bent at right angles thereto, is a small lug 60 which is received in an opening 61 in panel 13c, there being three of the openings 61 disposed 90° apart around the axis of screw 59 as shown in Fig. 9, and thus it is possible to arrange bracket leg 57 at any one of three positions 90° apart, the lug 60, by its engagement in an opening 61, serving to secure the leg in any of such adjustment positions. At its opposite end, leg 57 has an apertured ear 62 for attachment to shelf member 10c by a screw 63.

To the underside of panel 13c is secured a pair of pads 64 to protect the finish of shelf member 10c against abrasions, the pads 64, near the forward end of the panel 13c, being adapted to rest upon shelf member 10c where it curves downwardly to join the vertical panel of the dash.

Panel 13c (aside from openings 61) and all other parts of the secretary are identical to panel 13a of Figs. 4-6.

I claim:

1. In an automobile secretary: a panel for supporting a work sheet; a light reflector hood having a light bulb mounted therein disposed transversely over one end of said panel, said hood having a top wall, rear wall and lateral walls, being open at the bottom and having an open front to emit light rays upon said work sheet when said hood is in a lowered position relative to said panel, said top wall being parallel to said panel in said lowered position; pivot means disposed on an axis adjacent and parallel to said end and connecting said hood to said panel so that said open front may be lifted upwardly; a hold-down yoke of spring wire having a pair of side arms pivotally attached to said pivot means, and having a hold-down bar joined to said side arms and extending transversely between them in a position to bear downwardly upon said end of the work sheet, said side arms each having an extension projecting upwardly and positioned to be engaged by said rear wall of the hood as the latter is moved downwardly to said lowered position, and thereby loaded in a manner to transmit through said side arms to said hold-down bar, downward pressure against said work sheet, said downward pressure being relieved when said hood is lifted, and means for latching said hood in said lower position, said extension being biased to urge the hood to a raised position when the hood is unlatched.

2. A secretary as defined in claim 1, wherein said hold-down bar, side arms and extensions are formed integrally of spring wire, and wherein said yoke includes loops joining said extensions to said side arms, said pivot means comprising a transverse pin extending through said loops to provide said pivotal attachment thereof to the side arms.

3. In an automobile secretary: a panel for supporting a work sheet; a light reflector hood including a top wall, lateral walls and a rear wall and having an open front for emission of light rays; pivot means pivotally attaching said hood to said panel in a position extending transversely over one end of the panel, with the lower extremity of said rear wall disposed adjacent and parallel to said one end of the panel, for upward swinging movement of said open front, on an axis adjacent and parallel to said one end of the panel, from a normal, lowered position in which the lower extremities of said lateral walls adjoin the side margins of said panel; means coacting between said lower extremities of the lateral walls and side margins of the panel, for releasably latching the hood to the panel in said lowered position; a lamp bulb carried by said hood beneath said top wall, concealed by said hood when the latter is in said lowered position, and exposed when said hood is lifted; and hold down means in the form of a yoke having a pair of side arms pivotally attached to said pivot means and including a bar extending transversely between the forward ends of said side arms in said open front of the hood for downward engagement upon one end of said work sheet to hold the same to the panel, said side arms each having an extension projecting outwardly and positioned to be engaged by said rear wall of the hood as the latter is moved downwardly to said lowered position so as to cause said bar to exert downward pressure against said work sheet and said extension yieldingly acting between said panel and hood and tending to raise the hood from the panel when the hood is in said lowered position.

4. An automobile secretary: as defined in claim 3, said panel of sheet material having an upturned end flange along its forward end and having parallel upturned lateral flanges along its respective side margins at its rear end and said coacting means being depressed portions located in said lateral walls and lateral flanges.

References Cited in the file of this patent

UNITED STATES PATENTS

| | | |
|---|---|---|
| 245,926 | Ahrens | Aug. 23, 1881 |
| 881,970 | Spiro | Mar. 17, 1908 |
| 1,030,825 | Knoerzer et al. | June 25, 1912 |
| 1,377,415 | Gay | May 10, 1921 |
| 1,464,552 | Warner | Aug. 14, 1923 |
| 2,029,425 | Kaylor et al. | Feb. 4, 1936 |
| 2,201,789 | Robilotto | May 21, 1940 |
| 2,227,329 | Stone | Dec. 31, 1940 |